Patented Apr. 7, 1925.

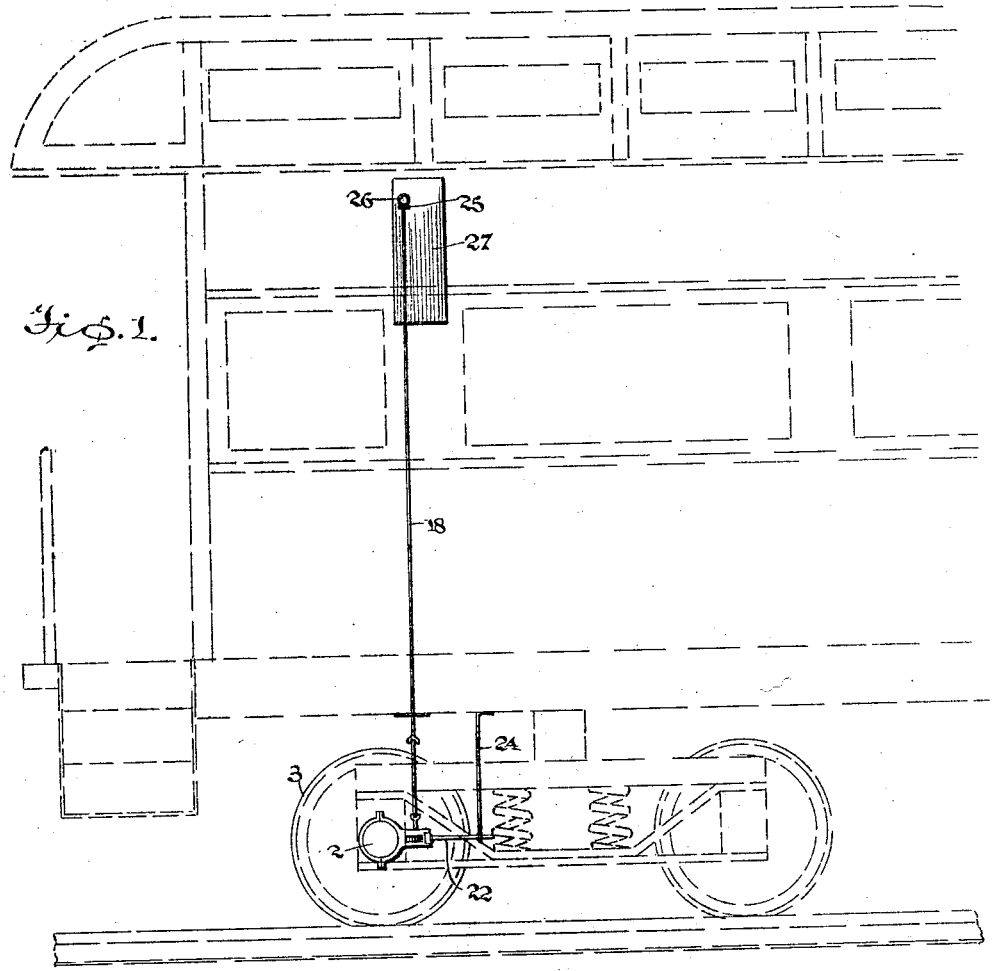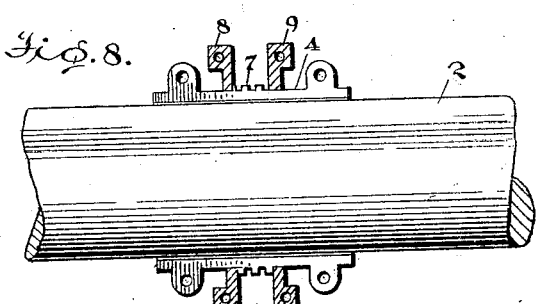

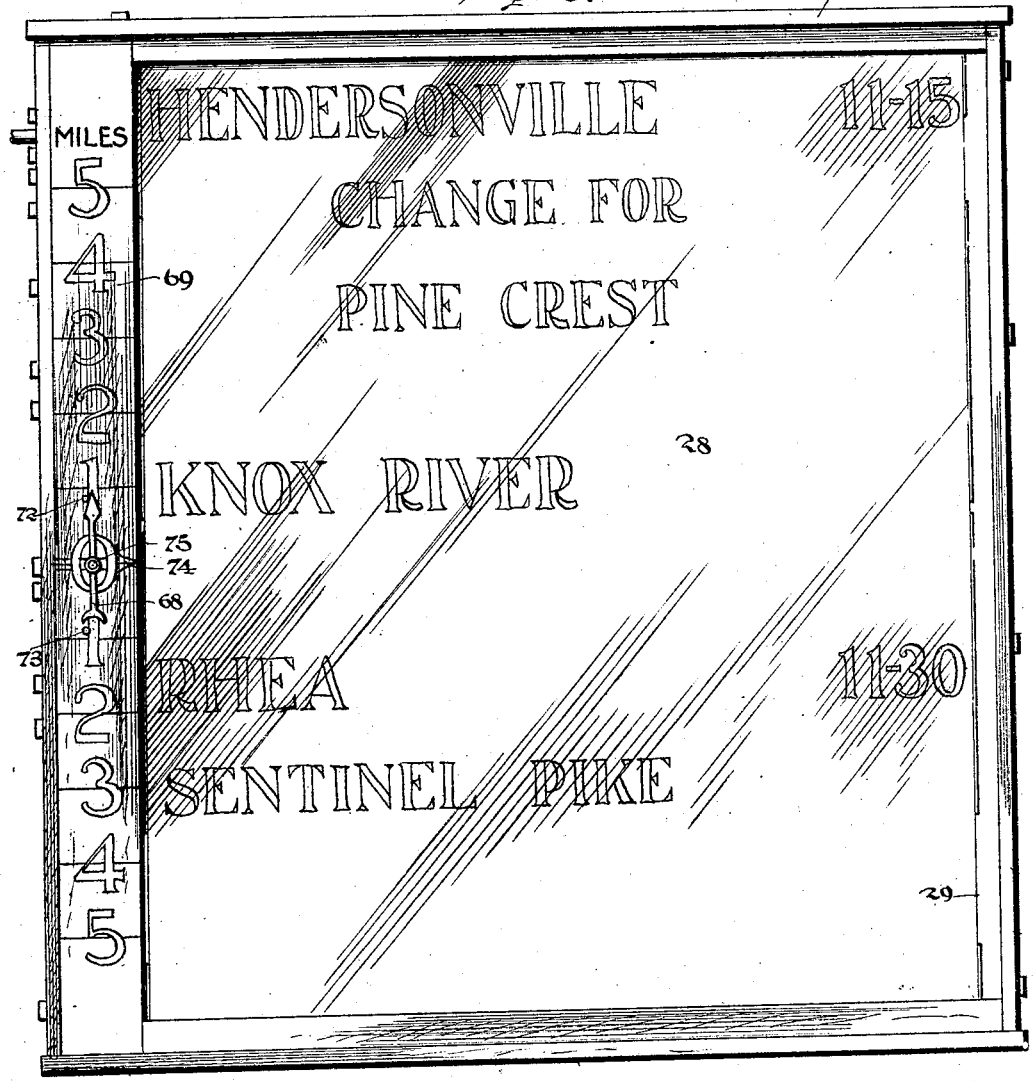

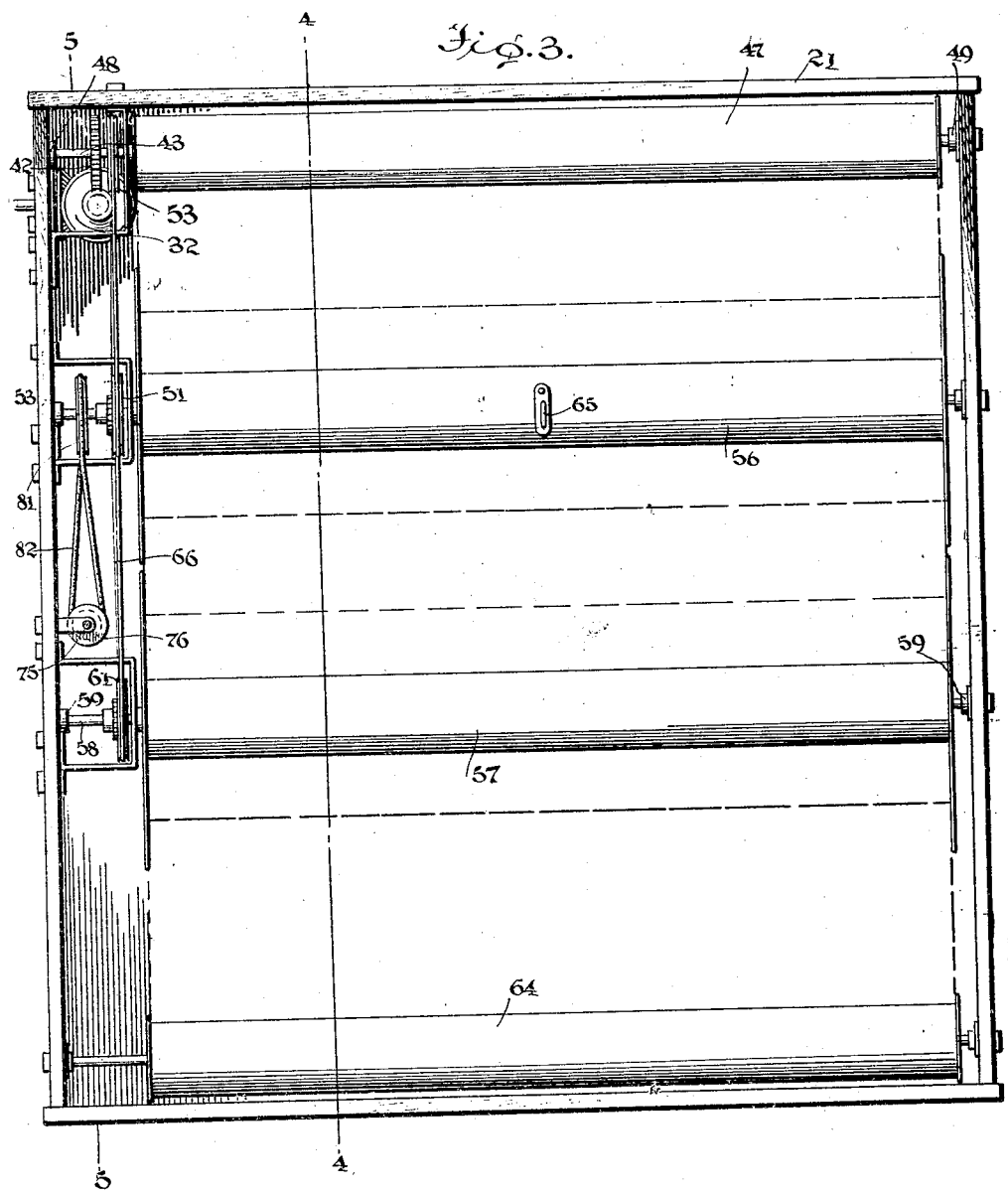

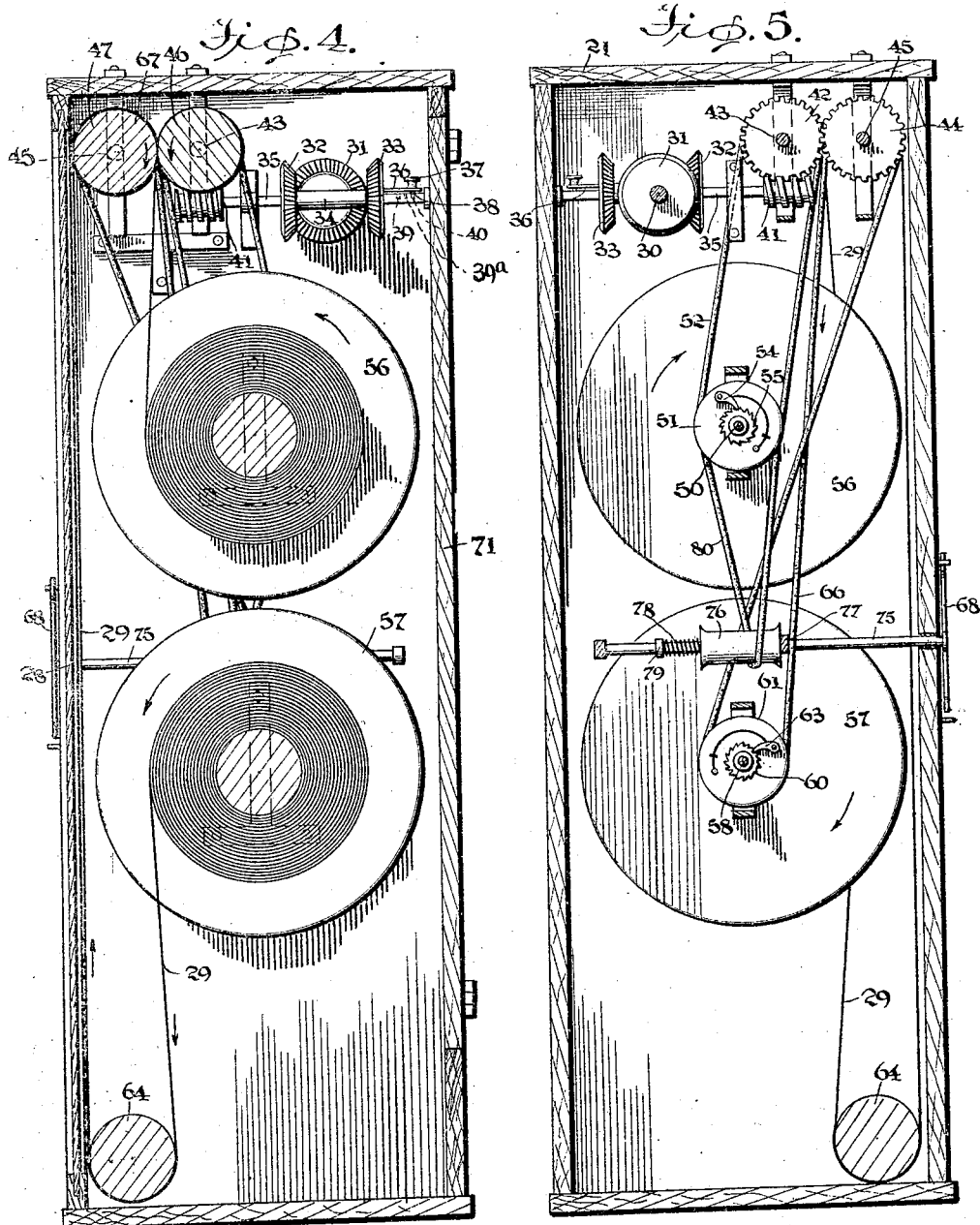

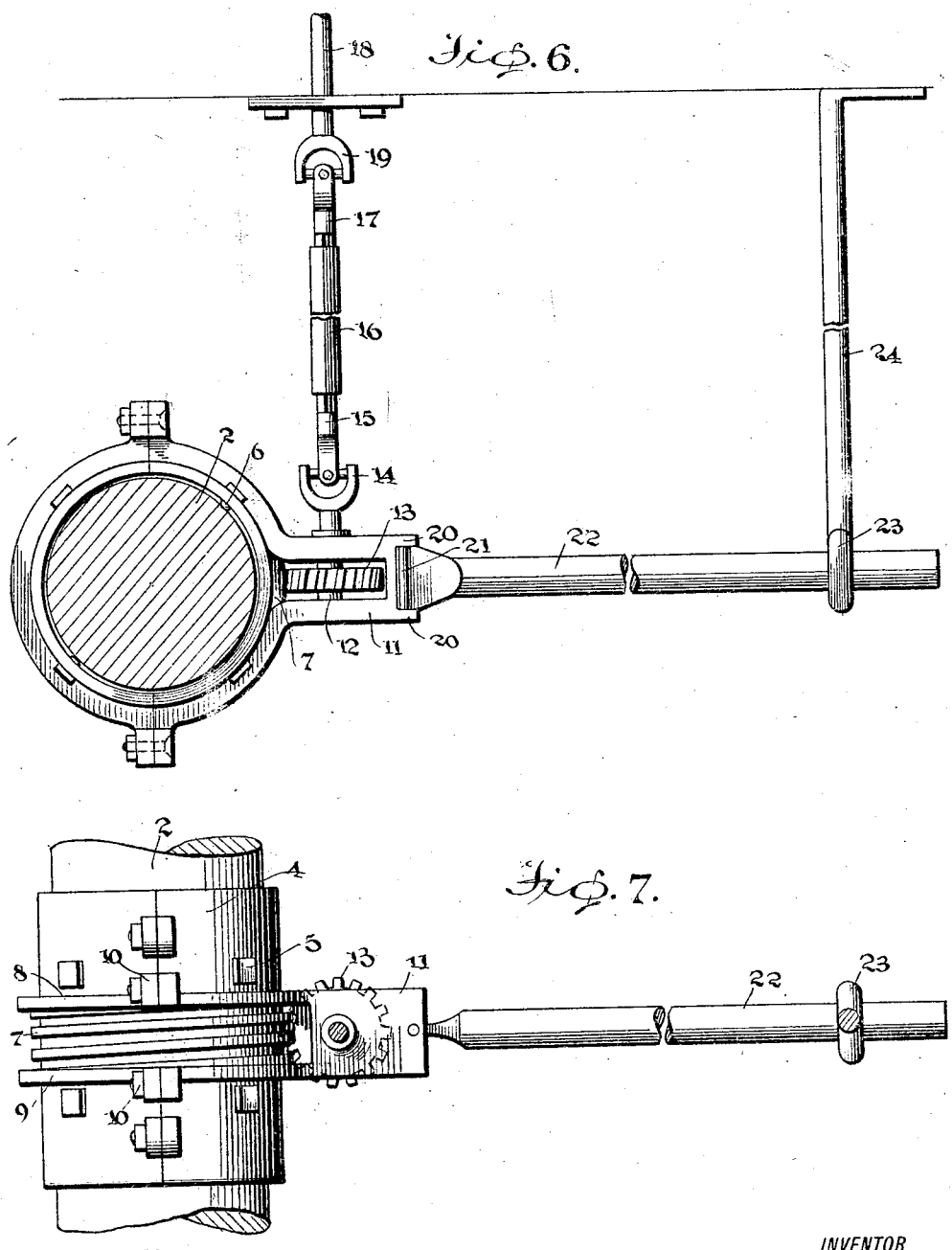

1,532,731

UNITED STATES PATENT OFFICE.

PAUL H. COLEMAN AND FRED W. STOUT, OF LYNCH MINES, KENTUCKY.

ROUTE INDICATOR FOR VEHICLES.

Application filed November 23, 1922. Serial No. 602,852.

*To all whom it may concern:*

Be it known that we, PAUL H. COLEMAN and FRED W. STOUT, citizens of the United States, and residents of Lynch Mines, in the county of Harlan and State of Kentucky, have invented certain new and useful Improvements in Route Indicators for Vehicles, of which the following is a specification.

This invention relates to route indicators for railway coaches, street cars or automobile busses.

An object of the invention is the provision of a device operatively connected with the running gear of a vehicle for causing display of the names of the numerous stations along the route as the stations are reached. Additional information for the convenience of the travelling public is progressively advanced in connection with the advancement of the names of the several stations.

A further object of the invention is the provision of a device operatively connected with the running gear of a vehicle for displaying names of the numerous stations along the route with means for automatically reversing the mechanism when the car is reversed to maintain the names of the station in their proper position relative to the position of the vehicle on a predetermined portion of the route.

Another object of the invention is the provision of a device operatively connected with the running gear of a vehicle for displaying the names of the numerous stations along the route with means for changing the direction of the normal linear movement of the ribbon carrying the names, regardless of the direction of movement of the vehicle.

Other objects and objects relating to details of construction will be hereinafter described.

In the accompanying drawings forming a part of this specification, and in which like reference numerals designate like parts throughout the same, Figure 1 is a side elevation of a railway coach showing our device in operative relation with the running gear of the coach, Figure 2 is a front elevation of the portion of the ribbon displaying certain of the stations, Figure 3 is a front elevation of the operating mechanism for feeding the ribbon, Figure 4 is a transverse vertical section taken along the line 4—4 of Figure 3, Figure 5 is a transverse vertical section taken along the line 5—5 of Figure 3, Figure 6 is a fragmentary view in side elevation of the operating means, showing a detailed construction of the operating mechanism connected with the running gear, Figure 7 is a fragmentary view in plan of the same, Figure 8 is a fragmentary view partly in section detailing certain parts of the operating mechanism mounted on the vehicle axle.

Referring to the drawings, 1 designates a vehicle having an axle 2 mounted for rotation by means of the wheels 3 of the truck of a vehicle.

Upon the axle 2 is rigidly connected a split sleeve 4. The two members of the split sleeve 4 are secured together by means of bolts whereby the sleeve is firmly held in position on the axle and adapted to be rotated with the axle 2. Slots 5 are formed in the sleeve 4 with set screws 6 engaging the axle to aid in maintaining the sleeve 4 rigid with the axle 2 in proper adjustment.

Formed integrally with the sleeve 4 is a worm 7. Mounted upon the sleeve 4 and in engagement with the ends of the worm 7 are rings 8 and 9 formed by two sections bolted together at 10 and connected by means of a U-shaped member 11 which is formed integrally with a pair of the sections of the rings 8 and 9 and projects diametrically outward from the sleeve 4. The rings 8 and 9 are adapted to have a limited rotary movement on the sleeve 4 when the U-shaped member 11 is oscillated as will be presently explained.

A shaft 12 is journaled in the legs of the U-shaped member and is provided with a worm gear 13 located between the legs of the U-shaped member and in mesh with the worm 7 whereby rotation of the worm 7 through the axle 2 causes rotation of the worm gear 13 and the shaft 12.

A knuckle joint 14 connects the end of the shaft 12 which projects laterally beyond the U-shaped member 11 to a sliding shaft 15 which has its free end slidable in a sleeve 16. A second shaft 17 likewise has a slidable connection with the sleeve 16, with both shafts being square in cross section and slidable in a passage in the sleeve. The passage conforms to and neatly fits the squared shafts whereby the sleeve and shafts turn simultaneously.

The sliding shaft 17 is connected to a vertical shaft 18 by means of a knuckle joint 19.

The outer free end of the U-shaped member 11 is bifurcated with the ears 20 forming bearings for a pintle 21 which is formed at the end of a rod 22. The outer free end of the rod 22 is slidably mounted in an eye 23 on the end of a bracket 24 which is connected at its inner end to the bottom of the vehicle 1. The pivotal mounting of the rod 22 and its sliding connection with the eye 23 permits oscillation of the U-shaped member 11, and thereby prevents breakage of the parts when the vehicle receives a jar incident to travel. The sleeve 16 likewise permits the shafts 15 and 17 to move vertically when the springs between the axle and the coach causes a vertical movement of the coach.

The upper end of the shaft 18 is provided with a gear 25 in mesh with a gear 26 mounted upon the outside of the indicator casing 27 shown in Figure 1. The indicator casing 27 is mounted within the car in a place where it may be conveniently seen by the occupants of the same. The front face of the casing is provided with a transparent member 28 across which is adapted to be displayed a ribbon 29 which is supplied with certain indicia for furnishing information to the travelling public.

The gear 26 shown in Figure 1 is mounted on a shaft 30 which extends horizontally through the casing and is provided at its inner end with a bevelled gear 31 which is adapted to mesh with either of the gears 32 or 33. The gears 32 and 33 are rigidly secured to a sleeve 34 slidably mounted on a square shaft 35. A resilient arm 36 is rigidly connected with the gear 33 and provided with an operating knob 37 and a detent 38 adapted to engage either one of the notches 39 or 40. When the detent 38 engages the notch 40 the gear 32 is held in mesh with gear 31 and when the detent engages the notch 39, gear 33 will mesh with gear 31, with gear 32 out of mesh.

A square shaft 35 is mounted in bearings secured to the inner wall of the casing 21. On the outer end of the square shaft 35 is rigidly secured a worm 41 which is adapted to mesh with a worm gear 42 rigidly connected with a shaft 43. Gear 42 meshes with gear 44, which is mounted on shaft 45. It will be seen that rotation of the worm 41 causes rotation of gears 42 and 44.

As shown in Figure 4 the shaft 43 is rigidly connected with a roller 46, while shaft 45 is rigidly connected with a roller 47. Both of these rollers are in engagement with each other and are surfaced with hard rubber.

As shown in Figure 3 the bearings 48 and 49 of the roller 47 are of the resilient type whereby said bearings may be forced toward the respective bearings of the roller 46 whereby the two rollers will be maintained in close association with each other. The bearings will prevent the rollers from unauthorized movement due to jars incident to road travel. Spaced from the shaft 43 is a shaft 50. This shaft is mounted in spring pressed bearings which will maintain the shaft from rotation except when the said shaft is positively rotated through a pulley 51 and a belt 52 which is trained around a pulley 53 mounted on the shaft 43 adjacent the gear 42.

The pulley 51 is loose on the shaft 50 and is provided with a spring pressed pawl 54 adapted to engage with the teeth of a ratchet wheel 55 mounted rigidly on the shaft 50 when the shaft 50 is rotated in the direction indicated by the arrow in Figure 5. Rigidly mounted on the shaft 50 is a spool 56 which is adapted to be rotated when the shaft is rotated. Spaced below the spool 56 is a second spool 57 rigidly connected with a shaft 58, the opposite ends of the shaft being mounted in spring pressed bearings 59 which are located upon the sides of the inner walls of the casing 21.

A ratchet wheel 60 is rigidly mounted on the shaft 58 while the pulley 61 is loosely mounted on said shaft. A spring pressed pawl 63 on the pulley 61 engages the teeth of the ratchet wheel 60 to cause rotation of the spool 57 in the direction indicated by the arrow in Figure 5. Each of the spools 56 and 57 are provided with hooks 65 adapted to engage with the perforation in the end of the ribbon 29. As shown in Figures 4 and 5, a twisted belt 66 is trained around the pulley 61 and the pulley 67, mounted on the shaft 45 shown in dotted lines in Figure 4 so that rotation of the shaft 45 will cause rotation of the pulley 67 and the spool 57.

As shown in Figure 4, the ribbon 29 after being wound on the spool 57 is passed over roller 64 then upwardly before the transparent member 28 of the casing, around roller 47 and then downwardly between rollers 47 and 46 and secured to the hook 65 on the spool 56.

As shown in Figure 2, using Knox River as the starting point, this name is printed on the ribbon 29 before starting out on the route. The time of starting is likewise noted on the right hand edge of the ribbon 29 opposite the various places so designated. It will likewise be noted that numerals designating the number of miles up to 5 are shown on the panel 69 to designate the number of miles between the various stations passed. Any other indicia may be employed on the ribbon to impart additional information to the travelling public, if desired. After the route has been travelled and the different stations designated on the route, gears 33 and 32 may be shifted in order to throw gear 33 into mesh with gear 31 and reverse the movement of the ribbon and thereby cause reversal of the names of the stations from the end of the line back to Knox River.

At the starting point designated Knox River and represented by zero on the panel 69, and located centrally of the length of the panel, is mounted an arrow 68 which is movable in an arc of 180° and which the pointer engaging either one of the stops 72 or 73 to prevent further movement of the arrow. The arrow indicates the direction in which the vehicle is travelling with the arrow 74 painted on the panel 69 pointing to places on the ribbon 29. These names on the ribbon when passing the arrow 74 will indicate to the passengers that the name of a town or place is such as designated by the name on the ribbon passing the arrow 74.

The arrow 68 is mounted on the outer end of a shaft 75 which projects through the panel 69 and which is mounted in bearings secured to the inner walls of the casing 27. As shown in Figure 5, a drum 76 is loosely mounted on the shaft 75 and engages at one end a stop 77 on the shaft and at its other end a spring 78. An adjustable means 79 engages the other end of the spring and maintains said spring in tension against the drum 76. A belt 80 operatively engaged between the drum 76 and a pulley 81 on the shaft 50 is adapted to cause rotation of the drum 76 through the pulley 81 when the shaft 50 is revolved. The pressure of the spring 78 between the adjustable means 79 and the drum 76 is sufficient to cause the shaft 75 to rotate with the drum 76 when the vehicle is started on its journey or upon its return thereby causing rotation of the arrow 68 until it engages either of the stops 72 or 73. During the rest of the journey the drum 76 rotates idly without effecting rotation of the shaft 75. It is to be understood that the arrow 68 will always point in the direction in which the ribbon 29 is moving while the arrow 74 designates the stations passed.

The operation of my device is as follows:

The forward movement of the vehicle causes rotation of the axle 2, likewise of the flexible shafts 15, 17 and 18 for rotating gear 25, gear 26 and shaft 30. Gear 31 is rotated by shaft 30 with gear 32 in mesh with gear 31 and operating shaft 35. Rotation of shaft 35 causes rotation of worm 41, gear 42 and the intermeshing gear 44. Rotation of gear 42 causes rotation of pulley 51 in the direction indicated by the arrow in Figure 5 through belt 52.

Pawl 54 engaging with the ratchet wheel 55 causes rotation of shaft 50 and likewise of spool 41.

When spool 41 is rotated in the opposite direction by the ribbon, pawl 54 idly engages the ratchet wheel 55 so that no rotation of shaft 50 is had.

Operation of spool 56 draws the ribbon 29 between the rollers 47 and 46 over roller 64 with the ribbon being fed from spool 57. By reason of the feeding of the ribbon 29 from spool 57, spool 57 will be rotated in the direction indicated by the arrow in Figure 5 with the pawl 63 inoperatively moving over the ratchet wheel 60.

If at any time it be necessary to reverse the movement of the vehicle the device will automatically reverse itself to rewind the ribbon on spool 57 and pay it out from spool 56.

Since, as shown in Figure 5, the spool 57 is moved in the direction as indicated by the arrow and the pawl 63 is inoperatively moving over the ratchet wheel 60, the shaft 58 will be driven by the belt 66 trained over the pulley 67. A reverse movement of the vehicle will cause a reverse movement of the shaft 30 as shown in Figure 5; likewise gear 32 and gears 42 and 44. Therefore, spool 56 will be revolved by the feeding of the ribbon 29 in the opposite direction while spool 57 will be operated through belt 66, pulley 61, and pawl 63, which now engages with the teeth of the ratchet wheel 60.

If at any time it is desired to reverse the movement of the ribbon regardless of the direction of movement of the vehicle, the gears 32 and 33 may be shifted simultaneously for causing one to mesh with gear 31 while the other is drawn out of mesh and vice versa.

A door 71, shown in Figure 4, which is hingedly mounted at the rear of the casing 27, is adapted to provide means for entering the casing to mount the ribbons on the several spools and for operating the spring arm 36 to adjust the gears 32 and 33.

An intermediate notch 39[a] is shown between the notches 39 and 40 which is adapted to be engaged by the lug 38 on the spring arm 36 for positioning the gears 32 and 33 in neutral position with respect to the gear 31.

Where it is convenient to build the casing in a partition of the vehicle, as shown in Figure 1, the rear door will be easily accessible, but where it is necessary to place the casing against the end wall, the same may be supported by hinges in any approved manner whereby the casing may be swung out as a whole from the wall in order to make the rear door accessible.

The cables are sufficiently lax to permit them to slide over their respective pulleys when required.

What we claim is:

1. In a vehicle, an apparatus for indicating the route taken by road vehicles comprising in combination a casing provided with a transparent face, spools mounted for rotation within the casing, a ribbon having serially disposed thereon indicia designating the stations of a route and connected at its opposite ends with the spools, means connected with the running gear of the vehicle for causing feeding of the ribbon from either spool, and an arrow mounted on the face of the casing for designating the linear movement of the ribbon and likewise the serially disposed names of the stations of the ribbon, and means connected with the operating means of the spool for automatically alining the arrow with the directional movement of the ribbon when a change in the direction of the vehicle is had, and means for maintaining the arrow in its directional position.

2. In a vehicle, an apparatus for indicating the route taken by road vehicles comprising a vertical shaft, means connecting the shaft with the running gear of the vehicle for causing rotation of the shaft, a casing mounted within the vehicle, a pair of spools mounted for rotation within the casing, means for operatively connecting one of the spools with the vertical shaft for causing rotation of said spool in one direction, means for operatively connecting the other spool with the vertical shaft for causing positive rotation of the second spool in a direction which is opposite to the positive rotation of the first mentioned spool, a ribbon having serially disposed thereon indicia designating stations of a route having its opposite ends operatively connected with the spools, the positive rotation of the first spool causing feeding of the ribbon from the second spool, while positive rotation of the second spool causes feeding of the ribbon from the first mentioned spool, an arrow, and means connected with the operating means of the spools for automatically alining the arrow with the directional movements of the ribbon.

3. In a vehicle, an apparatus for indicating the route taken by road vehicles comprising a casing mounted within the vehicle, a pair of spools mounted for rotation within the casing, a rotatable means connected with the running gear of the vehicle, means operatively connecting one of the spools with the rotatable means for causing rotation of said spool in one direction, means operatively connecting the other spool with the rotatable means for causing positive rotation of the second spool in a direction which is opposite to the positive rotation of the first mentioned spool, and a ribbon having serially disposed thereon indicia designating stations of a route having its opposite ends operatively connected with the spools, the positive rotation of the first spool causing feeding of the ribbon from the second spool, while positive rotation of the second spool causes feeding of the ribbon from the first mentioned spool, and means for transferring positive rotation from the first mentioned spool to the second spool, an arrow mounted for movement on the casing, means connected with the operating means of the spools for automatically alining the arrow with the directional movement of the ribbon, and means for maintaining the arrow in its directional position.

4. In a vehicle, an apparatus for indicating the route taken by road vehicles, comprising a pair of spools mounted for rotation within the vehicle, rotatable means connected with the running gear of the vehicle, means operatively connecting the spools with the rotatable means for positively rotating one of the spools, a ribbon having serially disposed thereon indicia designating the stations of a route and connected at its opposite ends with the spools whereby positive rotation of one of the spools will cause feeding of the ribbon from the other spool, and means for reversing rotation of the spools, an arrow mounted for movement adjacent the ribbon, means connected with the operating means of the spools for automatically alining the arrow with the directional movements of the ribbon.

5. In a vehicle, an apparatus indicating the route taken by road vehicles comprising a ribbon having serially disposed thereon indicia designating the stations of a route, means for positively moving the ribbon in one direction, means for causing reverse movement of the ribbon when the direction of the vehicle is reversed, means connecting the operating means for the ribbon to the running gear of the vehicle, an arrow mounted for movement adjacent the ribbon, means connected with the operating means for the ribbon for automatically alining the arrow with the directional movement of the ribbon, and means for maintaining the arrow in its directional position.

PAUL H. COLEMAN.
FRED W. STOUT.